United States Patent [19]

Lockhart

[11] Patent Number: 5,247,992
[45] Date of Patent: Sep. 28, 1993

[54] FLUID FOR RELEASING STUCK DRILL PIPE

[76] Inventor: Robert Lockhart, 321 E. Verot School Rd., Lafayette, La. 70508

[21] Appl. No.: 913,114

[22] Filed: Jul. 14, 1992

Related U.S. Application Data

[63] Continuation of Ser. No. 519,800, May 7, 1990, abandoned.

[51] Int. Cl.⁵ .................... E21B 31/00; E21B 31/03
[52] U.S. Cl. .................................. 166/301; 252/8.551
[58] Field of Search ...................... 166/301; 252/8.551

[56] References Cited

U.S. PATENT DOCUMENTS

| | | | |
|---|---|---|---|
| 2,900,026 | 8/1959 | Trusheim et al. | 166/301 |
| 3,099,624 | 7/1963 | Wilson | 166/301 X |
| 3,126,970 | 3/1964 | Rygg | 175/57 |
| 3,217,802 | 11/1965 | Reddie et al. | 166/301 |
| 4,427,564 | 11/1984 | Brownawell et al. | 166/301 X |
| 4,464,269 | 8/1984 | Walker et al. | 252/8.551 |
| 4,614,235 | 9/1986 | Keener et al. | 166/301 |
| 4,964,615 | 10/1990 | Mueller et al. | 252/8.551 |
| 5,127,475 | 7/1992 | Hayes et al. | 166/301 |

FOREIGN PATENT DOCUMENTS 1375792  2/1988  U.S.S.R. ............... 166/301

Primary Examiner—George A. Suchfield
Attorney, Agent, or Firm—Matthews & Associates

[57] ABSTRACT

This invention discloses a method which utilizes an improved spotting fluid composition to release a stuck drill string in the bore hole of an underground formation employing an aqueous drilling fluid, the improved composition used in contacting the mud cake which has been deposited on the well bore face against which the drill string has become stuck, the improved spotting fluid composition comprising of one or more carboxylic acids with specific chemical and physical properties. The acid or acids of choice must be used in the acid form and must have a pKa value maximum of 6.5, ambiant temperature water solubility minimum of 0.5 moles per liter and must generate a maximum pH of 4.0 in water at ambiant temperature.

8 Claims, 1 Drawing Sheet

FLUID FOR RELEASING STUCK DRILL PIPE

This is a continuing application of application Ser. No. 7/519,800, now abandoned, filed May 7, 1990.

FIELD OF THE INVENTION

The present invention relates to a method which utilizes an improved fluid composition for releasing a drill string which has become stuck in the bore hole of an underground formation. More particularly, the invention relates to an improved fluid composition for releasing such a drill string which has become stuck due to differential pressure sticking. The differential in pressure between the formation zone pressure and the hydrostatic pressure within the well bore is due to the density of the well bore fluid. Most particularly, the invention relates to an improved fluid composition comprising chemicals which cause dehydration of the filter cake with resultant increase permeability therein allowing equalization of the differential pressure and release of the stuck drill pipe.

RELATED ART

During subterranean drilling operations for oil, gas, minerals, or for disposal, the drill string can become stuck sufficiently such that it cannot be rotated or removed from the bore hole. There are a number of causes which may contribute to the problem including hole cave-in, undergauge hole, key seating and differential pressure sticking.

In some drilling operations where the drilling fluid of choice is nonviscosified water the drill string can become mechanically stuck. Such is the case when drilling through subterranean limestone deposits. Relief can be obtained by the injection of hydrochloric acid to dissolve limestone around the drill string, as described by Trusheim et al in U.S. Pat. No. 2,900,026.

Differential pressure sticking, in contrast to mechanical sticking, normally occurs when the drill string is in contact with a permeably zone in which the formation zone pressure is less than the hydrostatic pressure within the well bore. Other factors which may contribute to the differential pressure sticking include lack of motion of the drill string, the magnitude of the differential pressure, porosity and permeability of the zone and permeability of the wall cake.

Freeing the drill pipe stuck due to differential pressure is accomplished by equalizing the pressure at the point of sticking for a period of time sufficient for the pipe to be released. One method has been to match the hydrostatic pressure in the well bore with the zone pressure by circulating out the existing well bore fluid and replacing it with a lower density fluid. Such a procedure is time consuming and may create a hazard due to underweight fluid in the entire system. One purpose of the fluid is to provide the hydrostatic pressure necessary to prevent "blow out" of more highly pressured zones.

Alternatively, spotting fluids are used to create chemical and physical changes in the wall cake in the interval of the well bore where sticking has occurred. Changes in the wall cake such as decrease in thickness, increase in permeability, and increased lubricity all aid in the timely release of the drill pipe. Various additives and fluids have been proposed to achieve one or more of the desired results.

A S.U. Pat. No. 1,375,792 by YaPbIeB describes the use of an inorganic chelating agent for freeing jammed drill columns and tubing strings. Specifically, nitrilotrimethylphosphonic acid or its salt was used to chelate ions of Ca, Al, Fe and others leading to the loosening of the rockmass and reduction of friction between the contact surfaces. Reddie et al in U.S. Pat. No. 3,217,802 disclose the use of surfactant additives which include oxazolines, imidazoline or acid cracked "wool grease" dissolved in an oil or organic solvent. Lummus et al in U.S. Pat. No. 3,223,622 suggest the use of other surface active agents along with anti-foaming agents. Walker in U.S. Pat. Nos. 4,230,587 and 4,446,486 suggests the using of polymeric additives such as polyethylene glycol in water or brine to affect the release of the stuck drill pipe. Walker in U.S. Pat. No. 4,494,610 claims lower carbon number alcohols while Walker et al in U.S. Pat. Nos. 4,436,638 and 4,464,269 claim propoxylated alkanols as active for spotting fluid use. Brownawell et al in U.S. Pat. No. 4,427,564 describe the use of lactones in release of stuck drill pipe. Mueller et al in U.S. Pat. No. 4,964,615 claim organic esters in compositions for freeing jammed drill pipes.

In recent years the most common spotting fluids have been of the oil base variety using white or mineral oils. More recently, in the interest of providing a more environmentally safe spotting fluid with lower biotoxicity, fluids which do not contain oil or organic solvents have been introduced. Keener et al in U.S. Pat. No. 4,614,235 claim the use of mono and/or poly alkene glycol ether in a water base spotting fluid for the release of stuck drill pipe.

SUMMARY OF THE INVENTION

During drilling operations, a wall cake, made up of solids that have previously been suspended in the drilling fluid, is deposited. These solids are deposited on the well bore face as the fluid phase is lost into the formation. The function of an ideal wall cake is to reduce the fluid loss into the formation by sealing action of its various components such as hydrated clays, chemical additives and a combination thereof. If the sealing action is inadequate, then differential sticking of the drill pipe against the filter cake can occur.

The present invention comprises a method of using an improved water base spotting fluid composition containing a specific class of additives to affect the release of a drill pipe which has become stuck because of differential pressure. The class of additives used in this method includes carboxylic acids which are characterized by pKa value maximum of 6.5 and minimum ambient temperature water solubility of 0.5 moles per liter. Such carboxylic acids will generate a maximum pH of 4.0 in ambiant temperature water.

The composition used in this method acts in a manner which significantly lowers the pH within the filter cake and replaces many of the cations of the clay particles with hydrogen ions. This exchange renders the clay particles more hydrophobic, and they become dehydrated. The wall cake in general becomes dehydrated, resulting in a decrease in thickness and an increase in permeability. Equalization of the pressure differential between the subterranean formation and the fluid residing in the well bore will then occur, thus allowing the eventual release of the stuck pipe.

DESCRIPTION OF THE PREFERRED EMBODIMENTS

Figure 1:
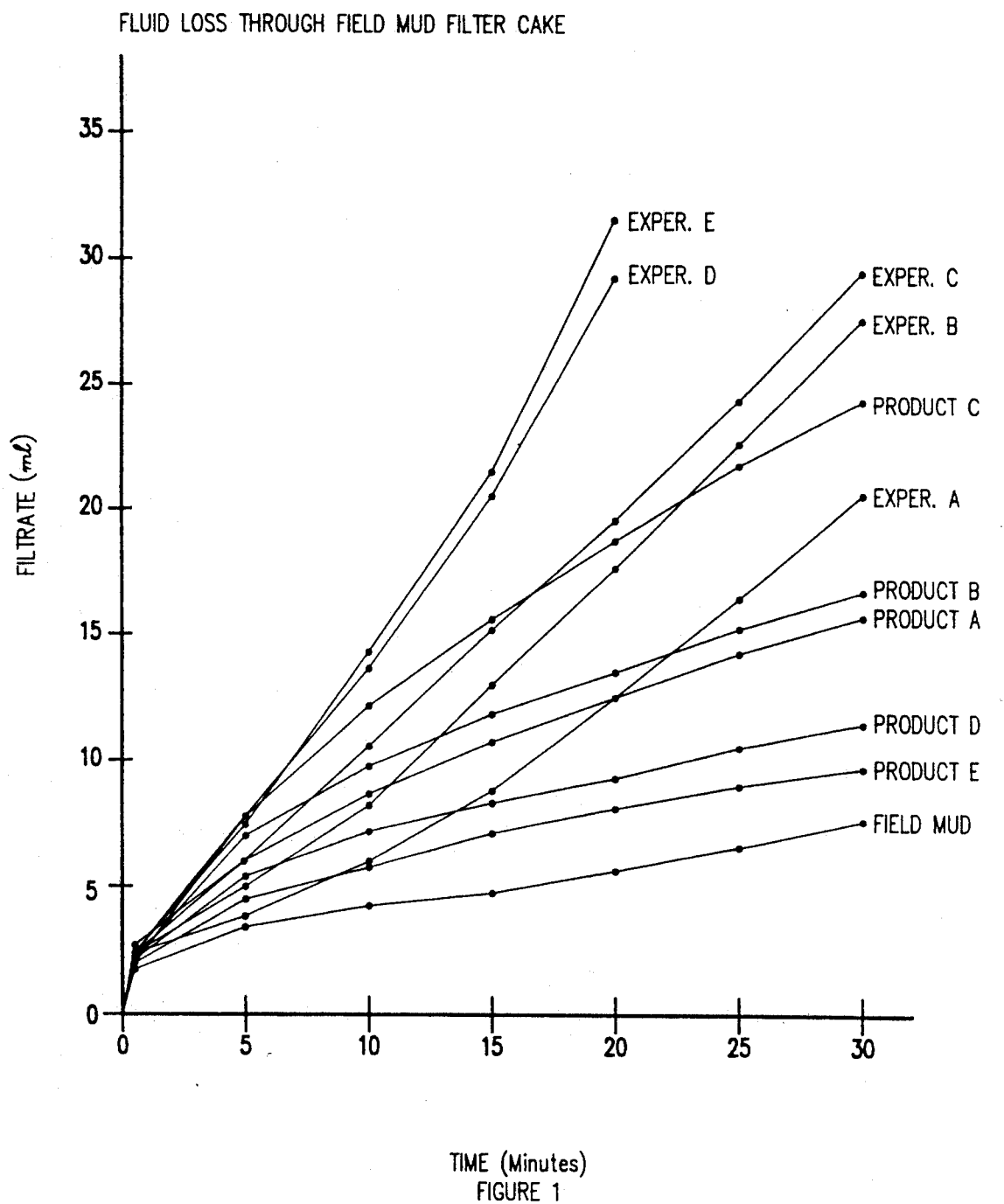
FIG. 1 is a plot comparing the changes in permeability of the drilling fluid filter cake when various additives of the present invention are applied to that filter cake. In each case, this application is done by the use of a water base spotting fluid containing the various additives.

The base fluid for a spotting fluid should be of sufficient viscosity to support the weighting material and be sufficiently stable under downhole conditions (elevated temperature and pressure) to remain intact for the duration of the spotting operation. A variety of commercially available water base drilling fluids perform this function satisfactorily.

The improved fluid composition includes the use of carboxylic acids, one or more of which is to be added to the base fluid. The acid or acids of choice must necessarily be used in the acid form. Each should have a pKa value maximum of 6.5, ambiant temperature water solubility minimum of 0.5 moles per liter and should generate a maximum pH of 4.0 in ambiant temperature water. Examples of such chemicals are aliphatic carboxylic, substituted aliphatic carboxylic, aliphatic dicarboxylic, substituted aliphatic dicarboxylic, aliphatic tricarboxylic and substituted aliphatic tricarboxylated acids. Typical of this class are formic, acetic, propionic, methoxyacetic, ethoxyacetic, glycolic, lactic, tartaric and citric acids.

EVALUATION

A test was designed to allow measurement of change in the filtration properties of a filter cake when it is subjected to a spotting fluid. This was accomplished by the use of a high temperature-high pressure (HTHP) fluid loss cell which is normally used for evaluating filter cake properties. The magnitude of the fluid loss relates directly to the lack of integrity of the filter cake. Increased fluid loss is desirable as result of the action of a spotting fluid and indicates greater activity as a filter cake modifier.

A field mud was loaded into the cell and a normal fluid loss test was started. After ten minutes at 300° F. and 500 psi differential pressure the test was suspended, the cell dismantled and the filter cake reserved. More of the same field mud was loaded into the cell and the reserved filter cake was placed back into its original position in the cell. Test conditions were fully restored, and the fluid loss was monitored for another thirty minutes.

The same general procedure was used to test each spotting fluid candidate and to compare them to state-of-the-art products on the market. A mud filter cake was prepared as above and removed from the cell. The spotting fluid to be tested was loaded into the cell, the reserved mud cake was placed back into position in the cell, and the filtration test was run.

The results of the tests are tabulated in TABLE I and plotted in FIG. 1. All of the test fluids had approximately the same specific gravity of 1.54 grams per milliliter or 12.8 pounds per gallon. The field mud was a lignosulfonate mud with HTHP=21.0. Products A. D and C were commercially available oil base spotting fluids commonly used in differential pressure sticking situations. Products B and E were commercially available water base spotting fluids. The formulations of Experimental spotting fluids A, B, C, D and E are shown below, the additives being added to an appropriate water base fluid.

| Experimental Fluid A | |
|---|---|
| Lactic acid | 0.08 moles per liter |
| EDTA | 0.04 moles per liter |
| Experimental Fluid B | |
| Acetic acid | 0.10 moles per liter |
| Citric acid | 0.10 moles per liter |
| Experimental Fluid C | |
| Citric acid | 0.12 moles per liter |
| EDTA | 0.06 moles per liter |
| Experimental Fluid D | |
| Citric acid | 0.22 moles per liter |
| Exerimental Fluid E | |
| Glycolic acid | 0.18 moles per liter |
| EDTA | 0.05 moles per liter |
| HCl | 0.02 moles per liter |

TABLE I
FLUID LOSS THROUGH FIELD MUD FILTER CAKE

| Sample | Milliliters Filtrate (min) | | | | | | |
|---|---|---|---|---|---|---|---|
| | 0.5 | 5 | 10 | 15 | 20 | 25 | 30 |
| 1. Field Mud | 1.7 | 3.3 | 4.1 | 4.9 | 5.6 | 6.6 | 7.6 |
| 2. Product A | 2.2 | 6.0 | 8.8 | 10.9 | 12.5 | 14.1 | 15.8 |
| 3. Product B | 2.1 | 7.0 | 9.8 | 11.9 | 13.5 | 15.2 | 16.8 |
| 4. Product C | 2.0 | 7.8 | 12.2 | 15.7 | 18.8 | 21.7 | 24.3 |
| 5. Product D | 2.2 | 5.5 | 7.1 | 8.3 | 9.4 | 10.5 | 11.5 |
| 6. Product E | 2.0 | 4.5 | 5.9 | 7.1 | 8.1 | 9.0 | 9.8 |
| 7. Exper. A | 2.2 | 3.9 | 6.0 | 8.8 | 12.5 | 16.5 | 20.7 |
| 8. Exper. B | 2.2 | 5.0 | 8.4 | 13.0 | 17.8 | 22.7 | 27.7 |
| 9. Exper. C | 2.6 | 6.0 | 10.6 | 15.1 | 19.7 | 24.3 | 29.5 |
| 10. Exper. D | 2.3 | 7.8 | 13.7 | 20.5 | 29.2 | * | * |
| 11. Exper. E | 2.3 | 7.5 | 14.3 | 21.5 | 31.6 | ** | ** |

*Blew dry at 22 min. and 34.0 ml
**Blew dry at 21 min. and 35.

The invention claimed is:

1. A method for releasing a stuck drill pipe in a bore hole of an underground formation employing a water based drilling fluid, comprising contacting the interval of the bore hole in which the drill string has become stuck due to differential pressure sticking with a spotting fluid containing an additive composition effective for dehydrating the drilling fluid wall cake and releasing the stuck drill string, said additive composition containing a carboxylic acid which has a pKa less than 6.5, a water solubility greater than 0.5 moles per liter at ambiant temperature, and a pH value less than 4.0 in water at ambiant temperature.

2. The method of claim 1 wherein said carboxylic acid is selected from the group consisting of aliphatic carboxylic acids, substituted aliphatic carboxylic acids, aliphatic dicarboxylic acids, substituted aliphatic dicarboxylic acids, aliphatic tricarboxylic acids, and substituted aliphatic tricarboxylic acids.

3. The method according to claim 1 wherein said carboxylic acid is selected from the group consisting of formic acid, acetic acid, propionic acid, methoxyacetic acid, ethoxyacetic acid, glycolic acid, lactic acid, tartaric acid, and citric acid.

4. The method according to claim 1 in which said additive composition further comprises at least one mineral acid.

5. The method according to claim 4 wherein said mineral acid is hydrochloric acid, hydrofluoric acid, or sulfuric acid.

6. The method according to claim 1 in which said additive further comprises at least one organic chelating agent.

7. The method according to claim 6 wherein said organic chelating agent is ethylenediaminetetraacetic acid, nitrilotriacetic acid, or 1,2-diaminocyclohexane tetraacetic acid.

8. The method according to claim 1 in which said additive composition comprises 0.18 moles per liter glycolic acid, 0.05 moles per liter ethylenediaminetetraacetic acid and 0.02 moles per liter hydrochloric acid.

* * * * *